(12) United States Patent
Satou

(10) Patent No.: US 6,302,477 B1
(45) Date of Patent: Oct. 16, 2001

(54) IMPACT ENERGY ABSORBING STRUCTURE FOR UPPER PART OF BODY OF MOTOR VEHICLE AND ENERGY ABSORBER

(75) Inventor: Toshikatsu Satou, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/466,002

(22) Filed: Dec. 16, 1999

(30) Foreign Application Priority Data

Dec. 17, 1998 (JP) ................................... 10-358852

(51) Int. Cl.⁷ .......................... B60R 27/00; B60R 13/02; B60R 21/04
(52) U.S. Cl. ..................... 296/189; 296/146.7; 296/39.1; 280/751; 280/808
(58) Field of Search .................... 296/189, 146.7, 296/39.1; 280/751, 808

(56) References Cited

U.S. PATENT DOCUMENTS

| | | | |
|---|---|---|---|
| 5,382,051 | * 1/1995 | Glance | 280/751 |
| 5,544,933 | * 8/1996 | Shahab et al. | 296/189 |
| 5,564,744 | * 10/1996 | Frost | 280/751 |
| 5,575,500 | * 11/1996 | Mimura et al. | 280/751 |
| 5,660,426 | * 8/1997 | Sugimori et al. | 296/189 |
| 5,680,886 | 10/1997 | Ohtsuka . | |
| 5,779,270 | * 7/1998 | Tanaka | 280/808 |
| 5,826,907 | * 10/1998 | Saito et al. | 280/808 |
| 5,833,303 | * 11/1998 | Kawai et al. | 296/189 |
| 5,836,641 | * 11/1998 | Sugamoto et al. | 296/189 |
| 5,863,069 | * 1/1999 | Wickenheiser et al. | 280/751 |
| 5,863,071 | * 1/1999 | Li-Calso | 280/801.1 |
| 5,938,273 | * 8/1999 | Williams et al. | 296/189 |
| 6,012,764 | * 1/2000 | Seksaria et al. | 296/189 |
| 6,050,631 | * 4/2000 | Suzuki et al. | 296/189 |
| 6,059,342 | * 5/2000 | Kawai et al. | 296/39.1 |

FOREIGN PATENT DOCUMENTS

| | | | |
|---|---|---|---|
| 004015375A1 | * 11/1991 | (DE) | 296/189 |
| A9-142253 | 6/1997 | (JP) . | |

* cited by examiner

Primary Examiner—Joseph D. Pape
Assistant Examiner—G Blankenship
(74) Attorney, Agent, or Firm—Oliff & Berridge.PLC

(57) ABSTRACT

In an impact energy absorbing structure for an upper part of a body of a motor vehicle having a structural member that extends in a longitudinal direction and an inner trim member that is disposed toward an interior of a cabin and spaced apart from the structural member by a certain distance, an energy absorber is disposed within the distance. The energy absorber has two hollow tubular body portions whose axes extend in the longitudinal direction and a coupling portion for coupling the tubular body portions to each other. The two tubular body portions are formed integrally with the coupling portion, and the energy absorber is fixed to the structural member by the coupling portion.

13 Claims, 9 Drawing Sheets

IMPACT ENERGY ABSORBING STRUCTURE FOR UPPER PART OF BODY OF MOTOR VEHICLE AND ENERGY ABSORBER

INCORPORATION BY REFERENCE

The disclosure of Japanese Patent Application No. HEI 10-358852 filed on Dec. 17, 1999 including the specification, drawings and abstract is incorporated herein by reference in its entirety.

BACKGROUND OF THE INVENTION

1. Field of the Invention

The present invention relates to an impact energy absorbing structure for an upper part of a body of a motor vehicle, especially of a passenger car, and to an energy absorber.

2. Description of the Related Art

In an upper part of a body of a motor vehicle that is equipped with a structural member that extends in the longitudinal direction and an inner trim member that is disposed toward the interior of a cabin and spaced apart from the structural member by a certain distance, then is proposed a construction wherein an extruded metal hollow body is disposed within the distance so as to absorb impact energy.

This impact energy absorbing structure cam be manufactured easily because the extruded metal hollow body is used as an energy absorber. Also, the energy absorber exhibits a load-displacement energy absorption characteristic wherein the load rises abruptly. Besides, the effect of adjusting the energy absorption characteristic can mainly be achieved by changing a thickness of the hollow body.

For example the hollow body can be disposed inside a structural member such as a vehicular center pillar which may receive an impact load from the front, the rear or the side, with a view to absorbing impact energy. However, in such a case, it is necessary to arrange separately formed hollow bodies at three locations for attachment to the structural member or the inner trim member. This complicates the manufacturing and mounting processes.

SUMMARY OF THE INVENTION

It is an object of the present invention to provide an impact, energy absorbing structure for an upper part of a body of a motor vehicle and an energy absorber which can be realized in the one where an impact load may act in a plurality of different directions and can prevent complication of the manufacturing and mounting processes.

According to a first aspect of the present invention, am impact energy absorbing structure for an upper part of a body of a motor vehicle comprises a structural member extending in a longitudinal direction, an inner trim member disposed toward an interior of a cabin and spaced apart from the structural member by a certain distance, and in energy absorber disposed within the distance. The energy absorber has a plurality of hollow tubular body portions whose axis extend in the longitudinal direction and a coupling portion for coupling adjacent ones of the tubular body portions. The tubular body portions are formed integrally with the coupling portion and the energy absorber is fixed to the structural member or the inner trim member by the coupling portion.

The energy absorber, which has been formed with the tubular body portions so located as to correspond to an impact load that may act in a plurality of directions, is attached to the structural member or the inner trim member.

In this construction, no matter where the impact load comes, a suitable one of the tubular body portions mainly undergoes compressive deformation and thereby absorbs impact energy.

Because the single energy absorber provides protection against an impact load which may act in a plurality of different directions, and because the energy absorber can be made by extrusion molding or the like, the manufacturing process is made easier. In addition because the energy absorber can be attached securely to the structural member or the inner trim member, the mounting process is also made easier.

Because the hollow tubular body portions are used as the energy absorber, the energy absorption characteristic can be adjusted by changing thicknesses of the tubular body portions. Further, if the energy absorber is made of a metal suited for extrusion molding such am aluminium or aluminium alloy, it is possible to obtain a load-displacement energy absorption characteristic wherein the load rises abruptly.

If the structural member it at center pillar which is made by laying a flange of an outer panel on a flange of an inner panel and bonding the flanges and which has two corner portions that are spaced apart in the fore-to-aft direction in the cabin, the energy absorber may be designed to have two tubular body portions which are so disposed as to cover the two corner portions respectively and which are formed with polygonal cross-sectional shapes.

An impact load from the front acts an the tubular body portion covering the front corner portion and an impact load from the rear acts on the tubular body portion covering the rear corner portion, whereby the tubular body portions are plastically deformed and impact energy is absorbed. In this case, since the respective tubular body portions have polygonal cross-sectional shape, one or a plurality of sides forming a polygon buckle and thereby absorb energy. This guarantees a good energy absorption efficiency.

Preferably, the two tubular body pardons are famed such that when they are cut along a fictitious plane crossing the longitudinal direction it distance between the tubular body portions inside the cabin is smaller than a distance between the tubular body portions outside the cabin.

If an impact load acting sideways in applied to the two tubular body portions, the tubular body portions mainly undergo flexural deformation and absorb impact energy. In the case of flexural deformations, the reaction lead can be made smaller in comparison with the case of compressive deformation. Further, it is also possible to select thicknesses and shapes of the respective tubular body portions such that the tubular body portion covering the front corner portion and the tubular body portion covering the rear corner portion exhibit different energy absorption characteristics. Thus, it is possible to obtain an impact energy absorbing structure which provides different energy absorption for an impact load from the front, the side and the rear.

Because the energy absorber is fixed to the structural member or the inner trim member by the coupling portion, then is no need to provide the tubular body portions of the energy absorber serving to absorb energy with attachment holes. Therefore, there is no possibility of the energy absorption characteristic of the energy absorber being affected by such attachment holes. Also, since the tubular body portions are coupled to each other by the coupling portion, the number of attachment holes to be provided for attachment of the energy absorber can be reduced in comparison with the case where the tubular body portions are not coupled to each other. Further, if the energy absorber is fixed using tapping screws or the like, the number of tapping screws required is small, which leads to a reduction in cost.

According to a second aspect of the present invention, an energy absorber comprises two hollow tubular body portions, whose axes extend substantially in a snoop direction and a coupling portion for coupling the tubular body portions to each other. The energy absorber is formed by extrusion molding of a metal suited for extrusion molding.

The energy absorber, which in formed by extrusion moulding, can be manufactured easily. Also, since the energy absorber is made of a metal, it is possible to obtain an energy absorption characteristic wherein the load rises abruptly. Besides, by merely attaching the energy absorber to the center pillar, the impact energy absorbing structure for the upper part of the body of the motor vehicle can be realized.

BRIEF DESCRIPTION OF THE DRAWINGS

The foregoing and further objects, features and advantages of the present invention will become apparent from the following description of a preferred embodiment with reference to the accompanying drawings, wherein.

DETAILED DESCRIPTION OF PREFERRED EMBODIMENT

An impact energy absorbing structure according to a first embodiment of the present invention will be described hereinafter with reference to FIGS. 1 through 7.

Figure 1:
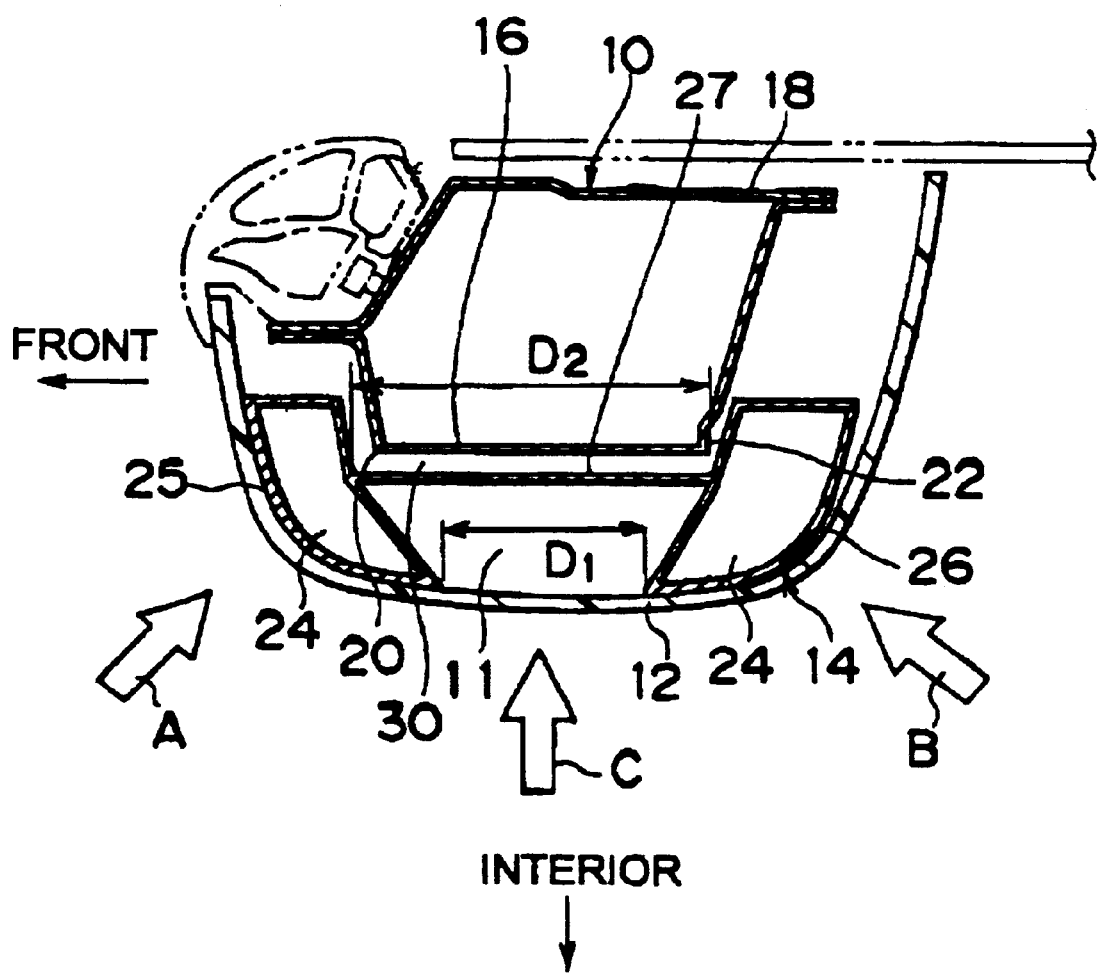
FIG. 1 is an enlarged cross-sectional view of an impact energy absorbing structure for an upper part of a body of a motor vehicle according to a first embodiment of the present invention, taken along a line I—I in FIG. 7.
Figure 2:
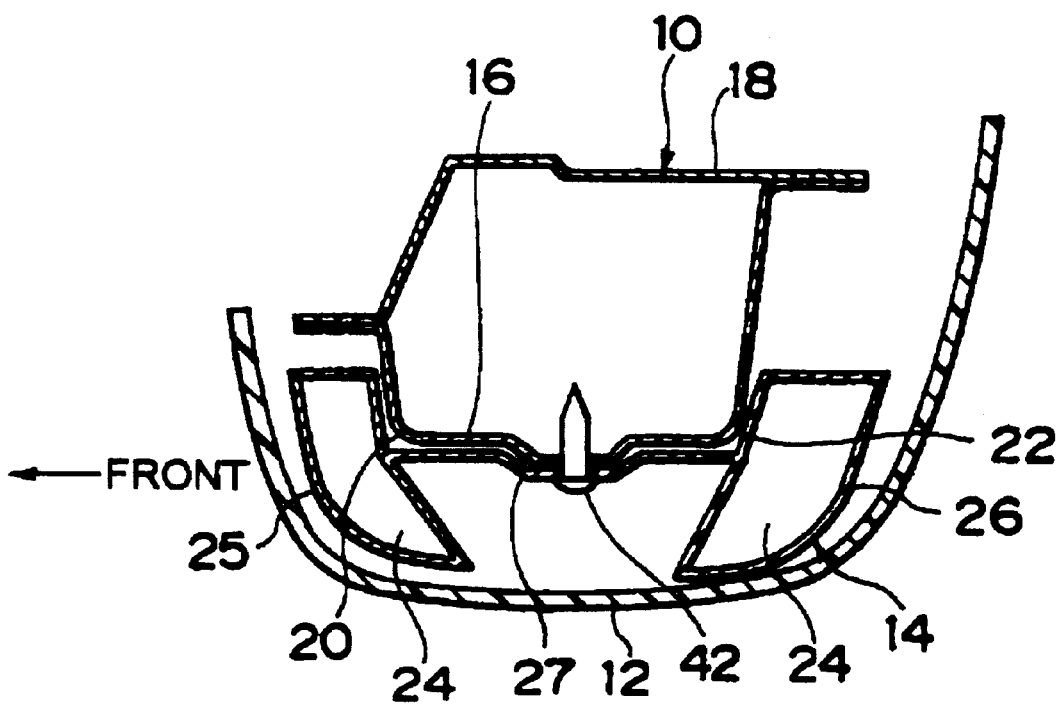
FIG. 2 is an enlarged cross-sectional view of the impact energy absorbing structure for the upper part of the body of the motor vehicle according to the first embodiment of the present invention, taken along a line II—II in FIG. 7.
Figure 3:
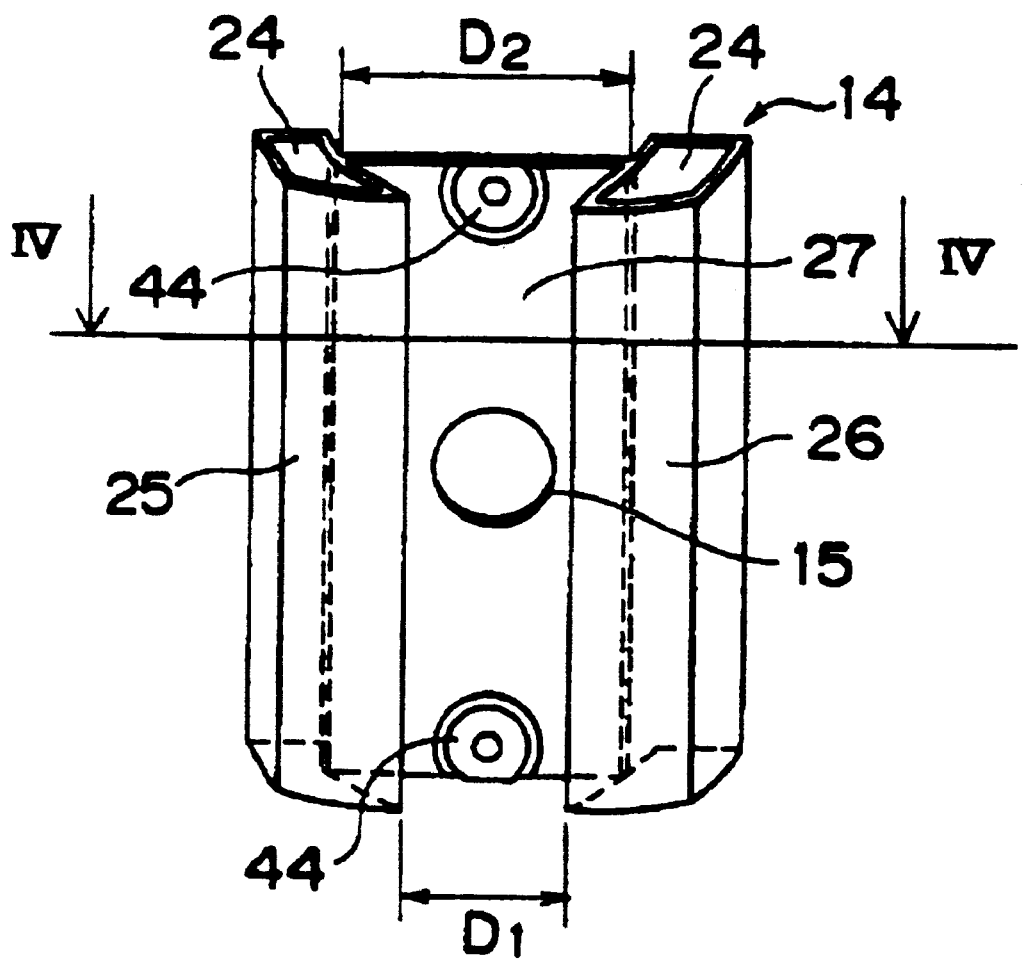
FIG. 3 is a perspective view of an energy absorber according to the first embodiment of the present invention.

Referring to FIGS. 1 and 2 which us cross-sectional views of the impact energy absorbing structure and FIG. 3 which is a perspective view of the impact energy absorbing structure, this structure is designed to absorb impact energy in an upper part of a body of a body of a motor vehicle that is equipped with a structural member 10 extending longitudinally and with an interior trim member 12 disposed toward the interior of a cabin and spaced apart from the structural member 10. The impact energy absorbing structure is equipped with an energy absorber 14.

The structural member 10 is a center pillar which, is, made by laying a flange of an outer panel 18 on a flange of an inner panel 16 and banding the flanges and which has two corner portions 20, 22 that with spaced apart in the fore-to-aft direction in the cabin The inner trim member 12 is a pillar garnish. The structure member 10 and the inner trim member 12 have structure that are known per se.

The energy absorber 14 has a plurality of tubular body portions 25, 26 and a coupling portion 27. The tubular body portions 25, 26, which are spaced apart from each other by a distance 11, have hollow spaces 24 therein. Axes of the tubular body portions 25, 26 extend in the longitudinal direction. The coupling portion 27 couples the tubular body portions 25, 26 which are located adjacent to each other. The tubular body portions 25, 26 are formed integrally with the coupling portion 27, and the energy absorber 14 is fixed to the structural member 10 or the inner trim member 12 by the coupling portion 27.

The energy absorber 14 of the first embodiment is provided with the two tubular body portions 25, 26, which are coupled to each other by the coupling portion 27. The two tubular body portions 25, 26 are formed integrally with the coupling portion 27.

Although the energy absorber 14 is manufactured by extruding a metal such as aluminium or aluminium alloy, it can also to manufactured by injection-molding a hard resin such as polypropylene. In the case where the energy absorber 14 is made of a metal, the energy absorber 14 exhibits an energy absorption characteristic wherein the load rises abruptly and is maintained at its peak value over a certain displacement range. On the contrary, in the case where the energy absorber 14 is made of a resin, the energy absorber 14 exhibits an energy absorption characteristic wherein the load rises gently as a whole and reaches its peak value and then falls. Accordingly, in order to determine whether the energy absorber 14 is to be made of a metal or a resin, it is essential to consider an amount of energy to be absorbed by the energy absorber 14 or a permissible load peak value.

Figure 4:
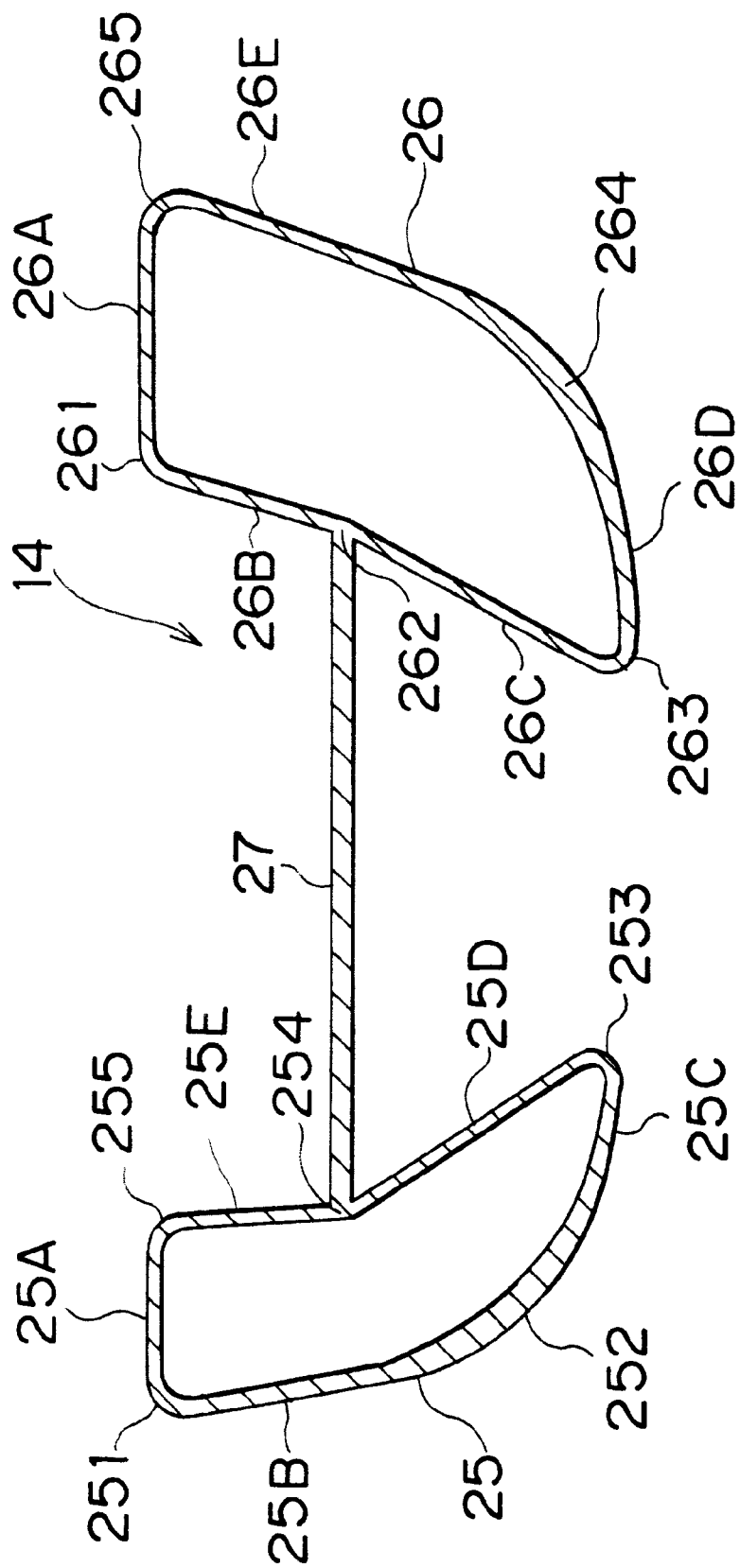
FIG. 4 is an enlarged cross-sectional view of the energy absorber according to the first embodiment of the present invention, taken along a line IV—IV in FIG. 3.

FIG. 4 shows a detailed cross-sectional shape of a face of the energy absorbing body 14 according to the embodiment of the present invention, the face being perpendicular to the longitudinal direction. As shown in FIG. 4, respective portions of the energy absorber 14 are different in thickness. In the case where the energy absorber 14 is made of a metal and formed by extrusion molding, the energy absorber 14 has a cross-sectional shape that substantially remains unchanged in the longitudinal direction.

The front tubular body portion 25 is a polygonal body mainly composed of five faces, namely, a vehicle-outer face 25A, a vehicle-front have 25B, a vehicle-inner face 25C, a vehicle-rear-inner face 25D and a vehicle-rear-outer face 25E. The five faces are interconnected to one another by their respective adjacent faces and by continuously curved flex portions 251, 252, 253, 254 and 255. In particular, the flex portion 252 between the vehicle-front face 25B and the vehicle-inner face 25C is curved with a smaller curvature in comparison with the other flex portions.

As for the thicknesses of the respective sections of the front tubular body portion 25, the vehicle-rear-inner face 25D is thinner than the other section, and the tax portion 252 which couples the vehicle-front face 26B to the vehicle-inner face 25C is thicker than the other sections.

The rear tubular body portions 26 is mainly composed of five faces, namely, a vehicle-outer face 26A, a vehicle-front-outer face 26B, a vehicle-front-inner face 26C, a vehicle-inner have 26D and a vehicle-rear face 26E. The five faces, are interconnected to one another by their respective adjacent faces and by continuously curved flex portions 261, 262, 268, 264 and 265. In particular, the flex portion 264 between the vehicle-inner face 26D and the vehicle-rear face 26E is curved with a smaller curvature in comparison with the other flex portions.

As for the thicknesses of the respective sections of the rear tubular body portion 26, the vehicle-front-inner face 26C is thinner than the other sections, and the flex portion 264 which couples the vehicle-inner face 26D to the vehicle-rear face 26E is thicker than the other sections.

The coupling portion 27 is thicker than the vehicle-rear-inner face 25D of the tubular body portion 25 and the vehicle-front-inner face 26C of the tubular body portion 26 and thinner than the flex portions 252 of the tubular body portion 25 and the flex portion 264 of the tubular body portion 26. The thickness of the coupling portion 27 can be changed suitably in long as then is in obstacle to the connection between two tubular body portion 25 and the tubular body portion 26.

As described above, the two tubular body portions 25, 26 have polygonal cross-sectional shapes. The polygonal shapes as mentioned herein represent a polygon in general, but include a shape having one or a plurality of rounded corner portions as shown in FIG. 4. The tubular body portions 25, 26 shown in FIG. 4 have pentagonal cross-sectional shapes as a whole. The two tubular body Potions 25, 26, which pass through the center between the corner portions 20, 22, need not be symmetrical with respect to a fictitious line perpendicular to the inner panel 16. As shown in FIG. 4, the tubular body portions 25, 26 an asymmetrical and the cross-sectional area of the front tubular body portion 25 is smaller than that of the rear tubular body pardon 26. The tubular body portions 25, 26 can also be formed such that the cross-sectional area of the former is larger thin that of the latter. The tubular body portions 25, 26 need not be equal in thickness.

As shown in FIGS. 1 and 2, the tubular body portion 25 of the energy absorber 14 is so disposed as to cover the front corner portion 20 of the center pillar 10, and the tubular body portion 26 of the energy absorber 14 is so disposed as to cover the rear corner portion 22 of the center pillar 10.

As shown in FIG. 1, the two tubular portions 25, 26 of the energy absorber 14 are formed such that when they are cut along a fictitious plane perpendicular to the longitudinal direction, it distance $D_1$ between the tubular body portions on the side of the interior of the cabin is smaller than a distance $D_2$ between the tubular body portions on the side of the coupling portion 27. The distance $D_2$ between the tubular body portions 25, 26 on the side of the coupling portion 27 is restricted by a width of the center pillar 10 in the fore-to-aft direction. However, the distance $D_1$ between the tubular body portions 25, 26 on the side of the interior of the cabin can be determined independently of the width of the center pillar 10. Therefore, the distance $D_1$ can be made equal to the distance $D_2$ between the tubular body portions on the side of the coupling portion 27. In this case, however, the cross-sections necessary for the tubular body portions 25, 26 cannot to guaranteed. As shown in FIG. 1, if the tubular body portions 25, 26 are formed such that the distance $D_1$ between the tubular body portions 25, 26 on the side of the interior of the cabin is smaller than the distance $D_2$ between the tubular body portions 25, 26 on the side of the coupling portion 27, the dimensions or cross-sections necessary for the tubular body portions 25, 26 can be guaranteed, whereby protection against an impact load from the side can be provided effectively. Preferably, the distance $D_1$ is set such that the sum of the length of the vehicle-rear-inner face 25D of the tubular body portion 25 and the length of the vehicle-front-inner face 26C of the tubular body portion 26 becomes equal to or smaller than the length of the coupling portion 27. In the case where the energy absorber 14 is fixed using tapping screws 42, the distance $D_1$ is preferably set such that the sum of the length of the vehicle-rear-inner face 25D of the tubular body portion 25 and the vehicle-front-inner face 26C of the tubular body portion 20 becomes equal to or smaller than a value obtained by subtracting the dimension of head portions of the tapping screws 42 from the length of the coupling portion 27. Thereby, when the energy absorber 14 is deformed, the vehicle-rear-inner face 25D of the tubular body portion 25 does not interfere with the vehicle-front-inner face 26C of the tubular body portion 26. Also, the head portions of the tapping screws 42 do not interfere with the vehicle-rear-inner face 25D of the tubular body portion 25 or the vehicle-front-inner face 26C of the tubular body portion 26. Thus, it is possible to inhibit generation of collapsed debris of the energy absorber.

As shown in FIGS. 2 and 3, the energy absorber 14 is provided with attachment seats 44 for attached the energy absorber 14 to the coupling portion 27 in the vicinity of ends thereof in the fore-to-aft direction. The attachment seats 44 protrude toward the interior of the cabin from central sections of the coupling portion 27. The two tapping screws 42 are passed through the attachment seats 44 and screwed into the inner panel 16, whereby the coupling portion 27 can be fixed to the structural member 10. In this state, there is a gap 30 formed between the inner panel 26 and an intermediate section of the coupling portion 27 (a section other than the attachment seats 44). The gap 30 serves to prevent the energy absorber 14 from interfering with the structural member 10 over the entire length of the vehicle body in the up-and-down direction, in the case where the structural member 10 is slightly curved in the up-and-down direction of the vehicle body. If the energy absorber 14 is manufactured through extrusion molding with the gap 30 formed, the energy absorber 14 can be attached to the structural member 10 without additionally processing the energy absorber 14 after the extrusion molding (e.g. without curving the energy absorber 14 along the structural member 10). Further, since the energy absorber 14 is fixed by means of the two attachment seats 44 provided on the coupling member 27, there is no need to provide the tubular body portions 25, 26 of the energy absorber 14 serving to absorb energy with attachment holes. Therefore, there is no possibility of the energy absorption characteristic of the energy absorber 14 being affected by such attachment holes. Also, since the tubular body portions 25, 26 are coupled to each other by the coupling portion 27, no more than two attachment holes are required for attachment of the energy absorber 14. Further, if the energy absorber is fixed using tapping screws or the like, the number of tapping screws required is small, which leads to a reduction in cost. This leads to a reduction in number of perforation processes in comparison with the case where the tubular body portions 25, 26 are not coupled to each other so that four attachment holes are required. Besides, the number of tapping screws required is relatively small, which leads to a reduction in cost.

Figure 13:
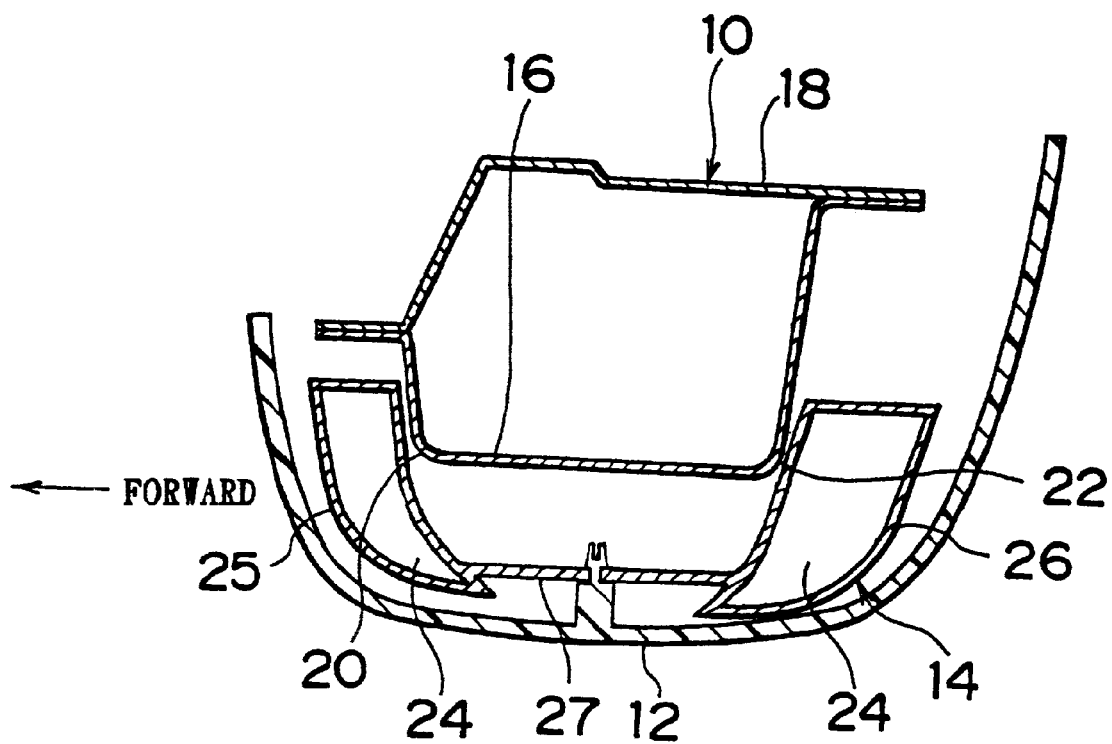
FIG. 13 is a cross-sectional view of an impact energy absorbing structure for an upper part of a body of a motor vehicle attaching a coupling structure to an inner trim member according to another embodiment of the invention.

Alternatively, as shown in FIG. 13, the energy absorber 14 can be fixed to the inner trim member 12 by inserting two clips through the inner trim member 12 and the coupling portion 27.

An insertion hole 15, through which a fixing bolt for fixing a later-described seat belt anchor 60 to the center pillar 10 is inserted, is formed in the energy absorber 14 substantially at the center in the up-and-down direction and between the aforementioned two attachment 44. The diameter of the insertion hole 15 is much larger than the outer diameter of the fixing bolt 63 so that there is a gap formed between the insertion hole 15 and the fixing bolt 68.

Figure 5:
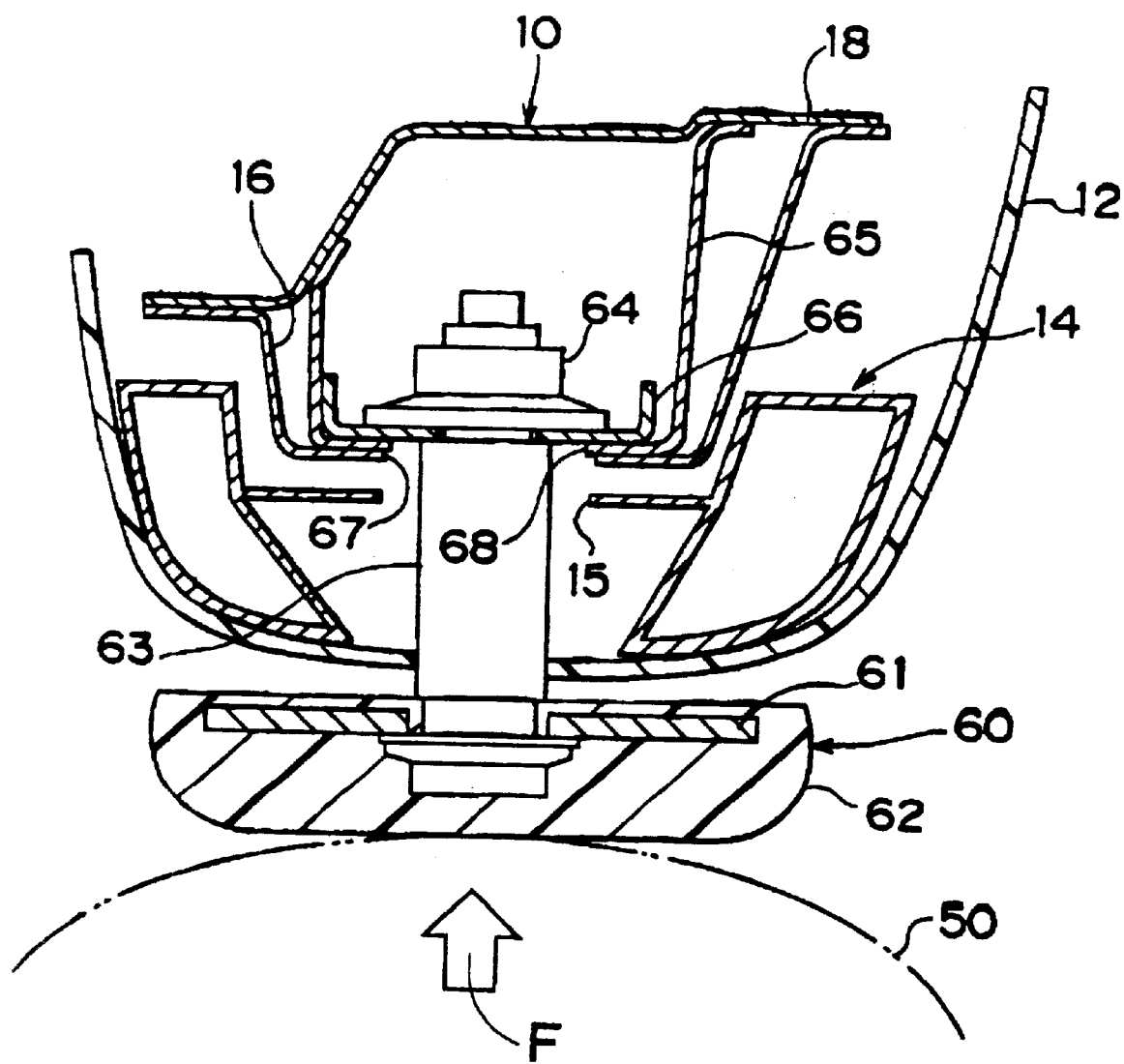
FIG. 5 is an enlarged cross-sectional view of the impact energy absorbing structure for the upper part of the body of the motor vehicle according to the first embodiment of the present invention, taken along a line V—V in FIG. 7.

As shown in FIG. 5, the seat belt anchor 60 has a metal anchor body 61 and a resinous pad portion 62 for covering the anchor body 61. The anchor body 61 is fixed to the center anchor body pillar 10 by the fixing bolt 68.

Figure 6:
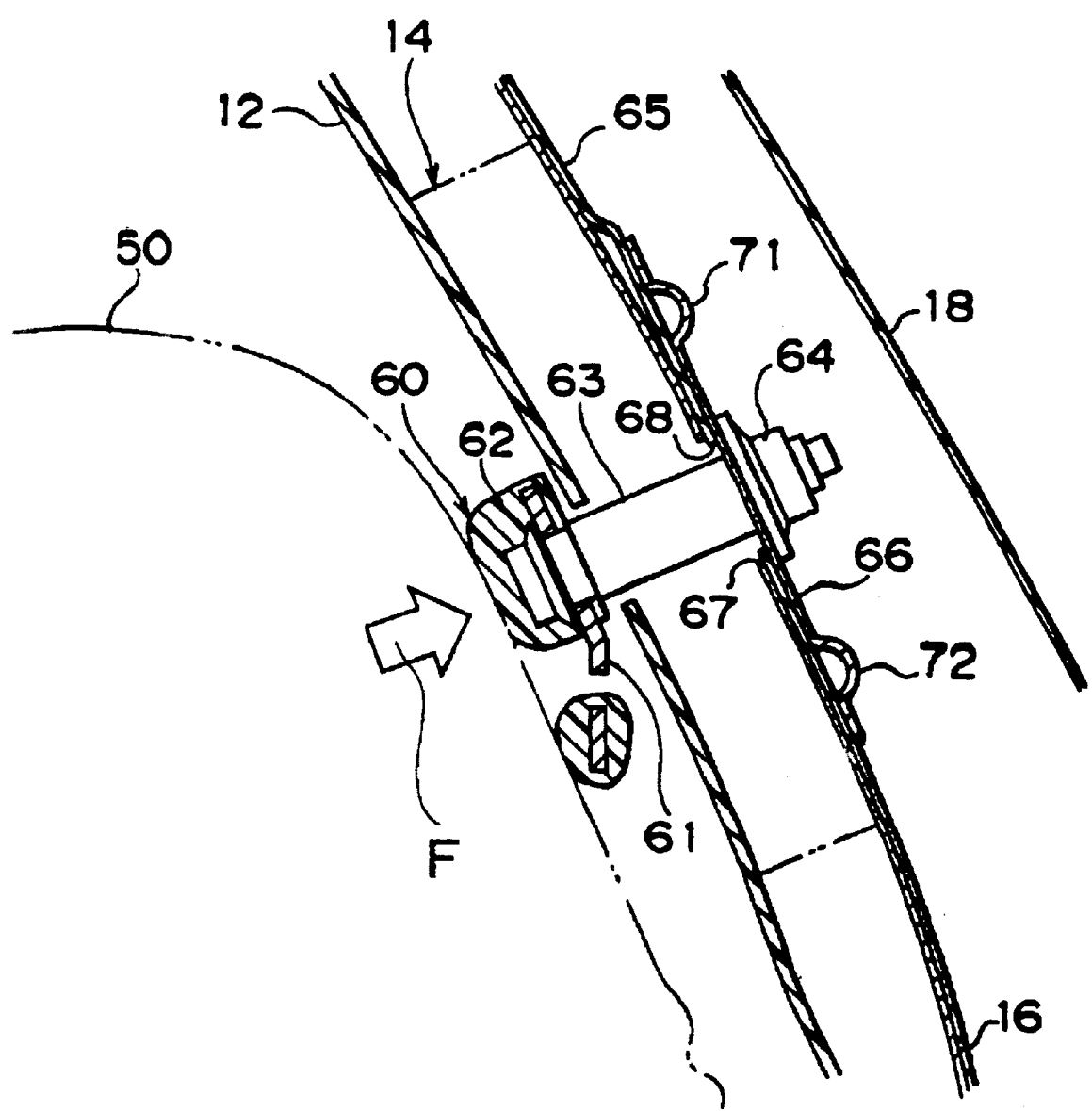
FIG. 6 is a cross-sectional view of the upper part of the body of the motor vehicle to which the impact energy absorbing structure of the present invention can be applied, taken along a plane perpendicular to the fore-to-aft direction of the vehicle and viewed from behind.

As shown in FIGS. 5 and 6, the center pillar 10 is provided with a reinforcement 65 and a bracket 66 at a location for attachment of the seat belt anchor 60. The reinforcement 65 is welded to the outer panel 18 and the inner panel 16. Insertion holes 67, 68 are formed in the inner panel 16 and reinforcement 65, respectively. The diameter of each of the insertion hole 67, 68 is much larger than the outer diameter of the fixing bolt 63 so that there is formed a gap between the insertion hole 67,68 and the fixing bolt 63. A weld nut 64, into which the fixing bolt 63 is screwed, is welded to the bracket 66. As shown in FIG. 6, the bracket 66 has two deformation beads 71, 72, which are spaced apart from each other and formed on opposed sides of a welding portion of the weld nut 64 in the up-and-down direction of the vehicle body. The bracket 66 is welded to the reinforcement 65, for example, by spot welding at a location above the upper deformation bead 71 and at a location below the lower deformation bead 72.

As shown in FIG. 6, the energy absorber 14 is disposed over the portion for attachment of the seat belt anchor 60 in the up-and-down direction.

Operation of the impact energy absorbing structure according to the present invention will be described hereinafter.

As shown in FIG. 1, the energy absorber 14, which in ready for use, may receive an impact load from the front A, an impact load from the rear B and an impact load from the side C. The following description will be made as to the case where the energy absorber is formed of aluminium.

Figure 9:
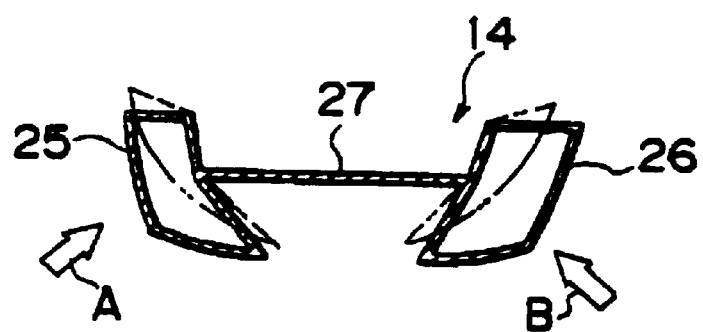
FIG. 9 is a cross-sectional view schematically showing operation of the energy absorber.
Figure 11:
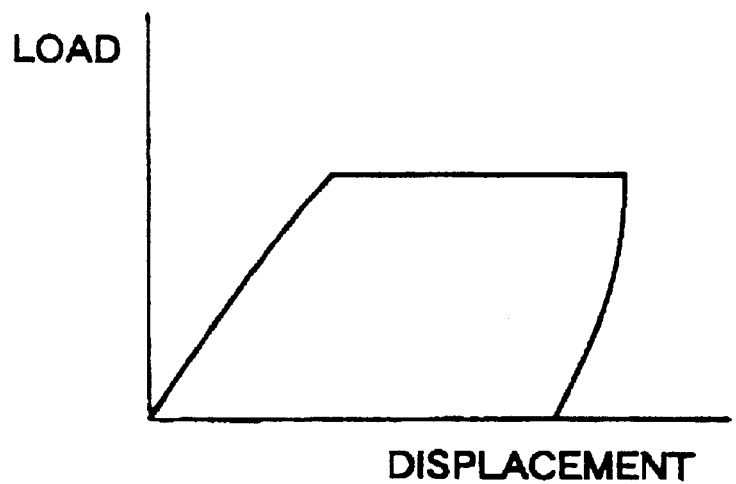
FIG. 11 is a load-displacement energy absorption characteristic diagram.

If the energy absorber 14 receives an impact load from the front A, the impact load mainly acts on the flex portion 252 of the tubular body portion 25. At this moment, since the flex portion 252 is thicker than the other sections, a reaction load exerted by the energy absorber 14 rises rapidly. Furthermore, the tubular body portion 25 undergoes compressive deformation as indicated by the fictitious line in the schematic drawing of FIG. 9. Therefore, the energy absorber 14 is deformed with the reaction load maintained. At this moment, the energy absorber 14 exhibits a load-displacement energy absorption characteristic as shown in FIG. 11. In a similar manner, if the energy absorber 14 receives an impact load from the rear B, the tubular body portion 26 mainly undergoes compressive deformation as indicated by the fictitious line in FIG. 9. In this case, the energy absorber 14 exhibits substantially the same energy absorption characteristic as shown in FIG. 11. As shown in FIG. 4 in detail, if the tubular body portion 25 is different from the tubular body portion 26 in cross-sectional area, the tubular body portion 26 exhibits an energy absorption characteristic that is analogous in the characteristic shown in FIG. 11.

Figure 10:
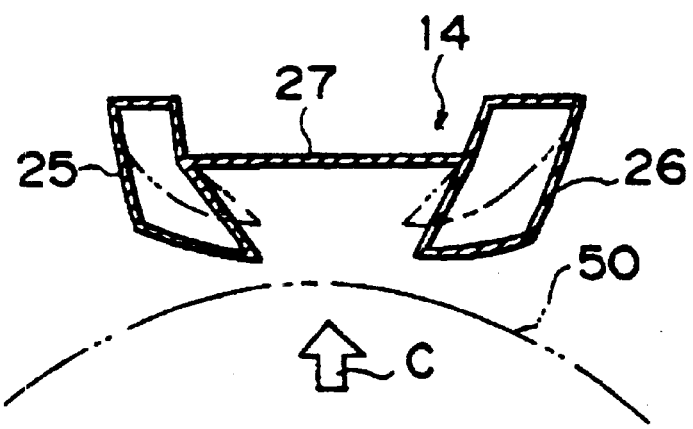
FIG. 10 is a cross-sectional view schematically showing operation of the energy absorber.
Figure 12:
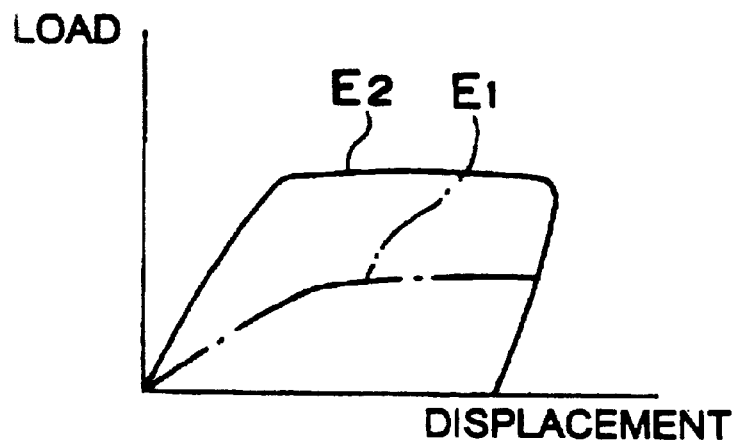
FIG. 12 is a load-displacement energy absorption characteristic diagram.

On the other hand, if the energy absorber 14 receives an impact load from the side C, the tubular body portions 25, 26 mainly undergo flexural deformation as indicated by the fictitious line in the schematic drawing of FIG. 10. More specifically, the vehicle-rear-inner face 26D of the tubular body portion 25 and the vehicle-front-inner face 26C of the tubular body portion 26 tumble down with connecting points 254, 262 between the tubular body portions 25, 26 and the coupling portion 27 acting as fulcrums respectively. As a result, the reaction loads exerted by the respective tubular body portions 25, 26 are smaller in comparison with the aforementioned case where the energy absorber 14 receives an impact load from the front A or an impact load from the rear B. At this moment, each of the tubular body portions of the energy absorber 14 exhibits an energy absorption characteristic as indicated by $E_1$ in FIG. 12. In the case where the energy absorber 14 receives an impact load 50 from the side C, the tubular body portions 25, 26 are deformed simultaneously. Therefore, as a whole, the energy absorber 14 exhibits a complex characteristic as indicated by $E_2$ in FIG. 12.

Thus, according to the impact energy absorbing structure of the first embodiments, the energy absorber 14 exhibits substantially the same energy absorption characteristic regardless of whether it receives impact loads from the front A and the rear B or an impact load from the side C. Therefore, it is possible to obtain an impact energy absorbing structure wherein the energy absorption characteristic does not depend on a direction in which an impact load is inputted.

The following description will be made as to the case where an impact load acts on the shoulder belt anchor portion.

As shown FIG. 6, in the case where an object 50 collides with the shoulder belt anchor portion of the upper pad of the body of the motor vehicle, the object 50 first collides with a pad portion 62 of the shoulder belt anchor 60, and an impact load F proceeding toward the exterior of the cabin acts on the pad portion 62 and then on the fixing bolt 63. Because the fixing bolt 63 is fixed only to the bracket 66, the impact load F acts on the bracket 66. The impact load F causes plastic deformation of two bead portions 71, 72 of the bracket 66, and the fixing bolt 63 and the intermediate section of the bracket 66 are displaced toward the exterior of the cabin. At the same time, reaction loads exerted through deformation of the bead portions 71, 72 partially absorb impact energy of the impact load F. If the shoulder belt anchor 60 (the fixing bolt 63) is displaced toward the exterior of the cabin, the object 50 collides with the energy absorber 14 via the pillar garnish 12, thereby deforming the energy absorber 14. At this moment the energy absorber 14 exhibits the same energy absorption characteristic as in the aforementioned case where it receives an impact load from the side C. Accordingly, in the case where the object 50 collides with the shoulder belt anchor portion, both energy absorption resulting from plastic deformation of the bracket 66 and energy absorption by the energy absorber 14 (see the characteristic curve $E_2$) occur.

Variations of the embodiment of the present invention will now be described.

An energy absorber 34, which is shown in a plan view of FIG. 6, has three tubular body portions, 35, 36 and 37, a coupling portion 38 for coupling the tubular body portions 35, 37 and a coupling portion 39 for coupling the tubular body portions 37, 36. In this construction, an impacts load from the side mainly acts on the tubular body portion 37, and the tubular body portions 35, 36 are deformed simultaneously.

Figure 8:
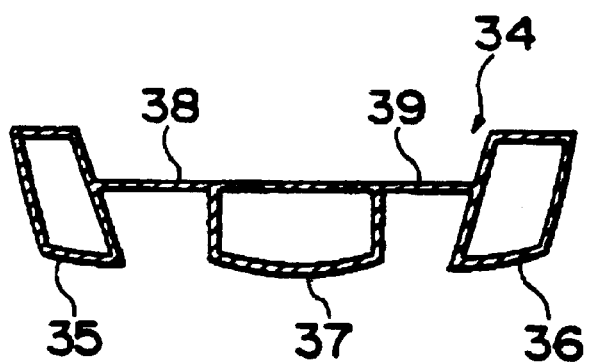
FIG. 8 is a cross-sectional view of another energy absorber that can be used for the impact energy absorbing structure for the upper part of the body of the motor vehicle according to the present invention.

In the energy absorber 14 shown in FIG. 3, the tubular body portions 25, 26 are formed such that the distance $D_1$ between the tubular body portion 25, 26 on the side of the interior of the cabin is smaller than the distance $D_2$ between the tubular body portions 25,26 on the side of the coupling portion 27. On the other hand, the energy absorber 34 shown in FIG. 8 is provided with the intermediate tubular portion 37. The impact energy absorbing structure according to the present invention can employ either the energy absorber 14 shown in FIG. 3 or the energy absorber 34 shown in FIG. 8. In the energy absorber 14 shown in FIG. 3, waste of materials is avoided by using ingenuity in shaping the tubular body portions 25, 26, so as to provide protection against an impact load from the side.

Figure 7:
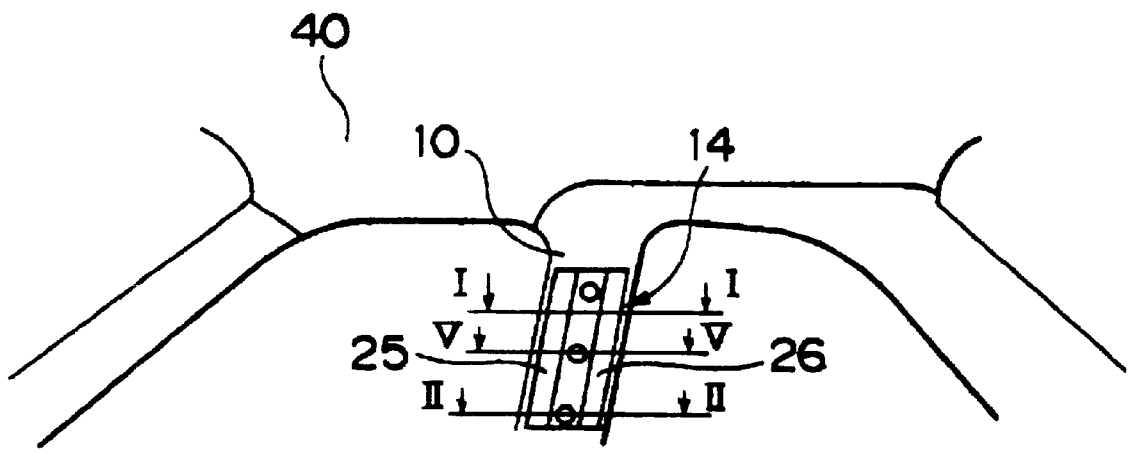
FIG. 7 is a side view of the upper part of the body of the motor vehicle to which the, impact energy absorbing structure according to the present invention can be applied, viewed from inside.

As shown in the side view of FIG. 7, the energy absorber 14 can be disposed in the center pillar 10 such that the axes of the tubular body portions 25, 26 extend in the longitudinal direction of the center pillar 10. By the way, there is a case where a beam member (not shown) extending in the direction of the width of the vehicle body between left and right roof side rails is disposed so as to support a roof panel 40 for a passenger car. In this case, the energy absorber 14 can be disposed substantially horizontally such that the tubular body portions 25, 26 an located in front of and behind the beam member respectively. In the former case, the total length of the energy absorber 14 should be set such that the energy absorber 14 is located above the shoulders of a passenger. In the latter case, it is desirable to set the total length of the energy absorber 14 such that the energy absorber 14 extends substantially over the entire width of the roof panel 40.

While the present invention has been described with reference to what is presently considered to be a preferred embodiment thereof, it is to be understood that the present invention in not limited to the disclosed embodiment or constructions. On the contrary, the present invention is intended to cover various modification and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An impact energy absorbing structure for an upper part of a body of a motor vehicle, comprising:

a structural member extending in a longitudinal direction;

an inner trim member disposed toward an interior of a cabin and spaced apart from the structural member by a certain distance; and an energy absorber disposed within the distance and having a plurality of hollow tubular body portions whose axes extend in the longitudinal direction and a coupling portion midway between the inner trim member and the structural member for coupling adjacent ones of the tubular body portions a designated distance apart, the tubular body portions being formed integrally with the coupling portion and the energy absorber being fixed to the structural member or the inner trim member by the coupling portion, the tubular body portions being one pair disposed at both sides of a pillar and being further formed such that when they are cut along a fictitious plane crossing the longitudinal direction, a distance between the tubular body portions nearest the interior of the cabin is smaller than a distance between the tubular body portions furthest the interior of the cabin.

2. The impact energy absorbing structure according to claim 1, wherein the energy absorber is formed by extrusion molding of a metal suited for extrusion molding.

3. The impact energy absorbing structure according to claim 1, wherein the hollow tubular body portions of the energy absorber have walls, at least a part of the walls partially differing in thickness.

4. The impact energy absorbing structure according to claim 1, wherein the structural member is a center pillar which is made by laying a flange of an outer panel on a flange of an inner panel and bonding the flanges and which has two corner portions that are spaced apart in a fore-to-aft direction in the cabin, and the energy absorber has at least two tubular body portions which are so disposed as to cover the two corner portions respectively and which are formed with polygonal cross-sectional shapes.

5. The impact energy absorbing structure according to claim 4, wherein a side of each of the hollow tubular body portions extending from the coupling portion of the energy absorber toward the interior of the cabin is thinner than the other sections of the respective tubular hollow body portion the side extends from.

6. The impact energy absorbing structure according to claim 4, wherein a section of each hollow tubular body portion of the energy absorber that faces the inner trim member is thicker than the other sections of the respective hollow tubular body portions.

7. The impact energy absorbing structure according to claim 4, wherein the coupling portion couples the tubular body portions at their substantially intermediate sections in a direction of width of the vehicle body.

8. The impact energy absorbing structure according to claim 4, wherein the corner portions of the structure member an covered by corner portions where the coupling portion of the energy absorber is coupled to the tubular portions.

9. The impact energy absorbing structure according to claim 1, wherein the energy absorber is fixed to the structural member at two locations, that is, at upper and lower locations.

10. The impact energy absorbing structure according to claim 1, wherein there is a gap formed between the energy absorber and the structural member.

11. The impact energy absorbing structure according to claim 1, wherein the energy absorber has an insertion hole, through which a fixing bolt for fixing a shoulder belt anchor is inserted, substantially at a center portion in an up-and-down direction, and the insertion hole has a diameter larger than an outer diameter of the fixing bolt.

12. The impact energy absorbing structure according to claim 1, wherein the shoulder belt anchor is fixed to the structural member through a bracket which is plastically deformed toward an exterior of the cabin upon application of an impact load.

13. The impact energy absorbing structure according to claim 1, wherein the energy absorbing structure has a central hollow tubular body portion disposed at a center of the pillar.

* * * * *